US008561142B1

(12) United States Patent
Sobel

(10) Patent No.: US 8,561,142 B1
(45) Date of Patent: Oct. 15, 2013

(54) CLUSTERED DEVICE ACCESS CONTROL BASED ON PHYSICAL AND TEMPORAL PROXIMITY TO THE USER

(75) Inventor: William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/487,099

(22) Filed: Jun. 1, 2012

(51) Int. Cl.
*G06F 7/04* (2006.01)
*G06F 15/16* (2006.01)

(52) U.S. Cl.
USPC .............. 726/3; 709/203; 709/217; 709/225; 713/155; 713/156; 713/157; 713/158; 713/159; 726/1

(58) Field of Classification Search
USPC ........ 726/1–8; 713/185–189; 709/3, 217–228
See application file for complete search history.

(56) References Cited

U.S. PATENT DOCUMENTS

| 6,684,255 | B1 * | 1/2004 | Martin | 709/231 |
|---|---|---|---|---|
| 7,539,746 | B2 * | 5/2009 | Bankier et al. | 709/224 |
| 7,729,363 | B2 * | 6/2010 | Shenfield et al. | 370/401 |
| 7,743,155 | B2 * | 6/2010 | Pisharody et al. | 709/227 |
| 7,761,906 | B1 * | 7/2010 | Nolan et al. | 726/3 |
| 7,774,462 | B2 * | 8/2010 | Dawson et al. | 709/225 |
| 7,891,004 | B1 * | 2/2011 | Gelvin et al. | 726/26 |
| 8,079,118 | B2 * | 12/2011 | Gelvin et al. | 26/26 |
| 8,239,917 | B2 * | 8/2012 | Hammond et al. | 726/1 |
| 8,327,425 | B2 * | 12/2012 | Dawson et al. | 726/6 |
| 8,396,458 | B2 * | 3/2013 | Raleigh | 455/414.1 |
| 8,428,264 | B2 * | 4/2013 | Maestrini et al. | 380/274 |
| 8,446,911 | B2 * | 5/2013 | Shenfield et al. | 370/401 |
| 8,452,881 | B2 * | 5/2013 | Boubez et al. | 709/229 |
| 2002/0103663 | A1 * | 8/2002 | Bankier et al. | 705/1 |
| 2003/0093691 | A1 * | 5/2003 | Simon et al. | 713/201 |
| 2005/0028001 | A1 * | 2/2005 | Huang et al. | 713/200 |
| 2005/0102388 | A1 * | 5/2005 | Tabbara et al. | 709/223 |
| 2006/0107311 | A1 * | 5/2006 | Dawson et al. | 726/5 |
| 2007/0070959 | A1 * | 3/2007 | Almeroth et al. | 370/338 |
| 2007/0136788 | A1 * | 6/2007 | Monahan et al. | 726/3 |
| 2007/0180493 | A1 * | 8/2007 | Croft et al. | 726/2 |
| 2008/0263209 | A1 * | 10/2008 | Pisharody et al. | 709/227 |
| 2008/0307488 | A1 * | 12/2008 | Hammond et al. | 726/1 |
| 2009/0183255 | A1 * | 7/2009 | Kiester et al. | 726/18 |
| 2009/0193247 | A1 * | 7/2009 | Kiester et al. | 713/151 |
| 2010/0188975 | A1 * | 7/2010 | Raleigh | 370/230.1 |
| 2010/0191613 | A1 * | 7/2010 | Raleigh | 705/26 |
| 2010/0192207 | A1 * | 7/2010 | Raleigh | 726/6 |
| 2010/0192212 | A1 * | 7/2010 | Raleigh | 726/7 |
| 2010/0205662 | A1 * | 8/2010 | Ibrahim et al. | 726/7 |
| 2010/0216430 | A1 * | 8/2010 | Brown et al. | 455/411 |
| 2010/0223560 | A1 * | 9/2010 | Shenfield et al. | 715/744 |

(Continued)

*Primary Examiner* — Haresh N Patel
(74) *Attorney, Agent, or Firm* — Brill Law Office; Jeffrey Brill

(57) ABSTRACT

A plurality of computing devices used to access backend computing resources of an enterprise by a specific user are identified, and geo-locations of the devices at specific times are tracked. A trusted authentication is received from a specific one of the devices. Responsive to the trusted authentication, the specific device is classified as the primary node of a trusted cluster, and the current geo-location of the user is defined as the geo-location of the specific device, as of the time of the trusted authentication. Devices are assigned to a logical trusted device cluster or to a logical non-trusted device cluster, based on distances between the device geo-locations and the current geo-location of the user, and based on differences between establishment times of the device geo-locations and the establishment time of the user's geo-location.

20 Claims, 4 Drawing Sheets

(56) References Cited

U.S. PATENT DOCUMENTS

| | | | |
|---|---|---|---|
| 2010/0263030 A1* | 10/2010 | Dawson et al. | 726/6 |
| 2011/0277013 A1* | 11/2011 | Chinta | 726/1 |
| 2012/0045060 A1* | 2/2012 | Maestrini et al. | 380/274 |
| 2012/0060030 A1* | 3/2012 | Lamb | 713/166 |
| 2012/0102549 A1* | 4/2012 | Mazzaferri et al. | 726/4 |
| 2012/0117611 A1* | 5/2012 | Wookey | 726/1 |
| 2012/0192249 A1* | 7/2012 | Raleigh | 726/2 |
| 2012/0210135 A1* | 8/2012 | Panchapakesan et al. | 713/172 |
| 2012/0210391 A1* | 8/2012 | Raleigh | 726/1 |
| 2012/0233673 A1* | 9/2012 | Ibrahim et al. | 726/5 |
| 2012/0233683 A1* | 9/2012 | Ibrahim et al. | 726/7 |
| 2013/0074193 A1* | 3/2013 | Baker | 726/28 |
| 2013/0091540 A1* | 4/2013 | Chen et al. | 726/1 |
| 2013/0091551 A1* | 4/2013 | Rajakarunanayake et al. | 726/4 |

\* cited by examiner

CLUSTERED DEVICE ACCESS CONTROL BASED ON PHYSICAL AND TEMPORAL PROXIMITY TO THE USER

TECHNICAL FIELD

This disclosure pertains generally to computer security, and more specifically to dynamically determining which of a plurality of computing devices associated with a user are trusted and which are non-trusted, based on the physical and temporal proximity of the computing devices to the user.

BACKGROUND

Computer users today often use multiple portable and desktop computing devices. For example, take a typical case of a person who uses a desktop computer, a laptop computer, a smartphone, and a tablet computing device. At any particular time, the user may have one or more of these devices in close physical proximity, while the others which are not currently needed are located elsewhere. The collection of devices in one's direct physical control varies over time depending upon the task at hand. For example, if the user is at work he might be operating a desktop computer and have a smartphone in his pocket. On a business trip, the user might bring a laptop computer, a smartphone and a tablet computing device.

It is not uncommon today for users to have multiple mobile computing devices, which can be carried in different combinations under different circumstances. For example, the user may choose from a variety of laptop computer and tablet computing devices, depending on the nature of a business or personal trip. For a short trip, the user may bring an ultra-light class computing device, a mobile phone, and a smaller 7" tablet. For a longer trip, the same user might bring a workstation class laptop, a mobile phone, and a larger 10" tablet. In these scenarios, there would be a set of active computing devices in close physical proximity to the user, and another set of computing devices not in close proximity, that are not currently being used. While the devices in the active set are with the user, the non-active devices could be located back at the user's office or home. Going forward, the number of computing devices in use by individuals will continue to proliferate, as will the form factors in which such devices are available. For example, user accessible computers in automobiles that give immediate access to, e.g., email (often using voice for control) are already available, and will become more common with time.

Enterprise level gateway filters typically control mobile device access to an organization's computing resources, such as internal web sites and mail services. Such gateway functionality is often provided by Microsoft's Exchange ActiveSync, or a similar product. Exchange ActiveSync is an Extensible Markup Language ("XML") based synchronization protocol that communicates over Hypertext Transfer Protocol ("HTTP") or Hypertext Transfer Protocol Secure ("HTTPS"). Exchange ActiveSync enables the synchronization of email, contacts, calendars, tasks and notes from a server running Microsoft Exchange to a mobile computing device, such as a smartphone, and also provides mobile device management and policy controls.

A user can be expected to operate the computing devices under his direct control, and these computers should be able to connect to remote systems to which the user has access. For example, the user has a legitimate need to use the devices on his person to connect to computer networks maintained by his employer or academic institution, e.g., via a gateway filter, in order to access his email and work related documents, run enterprise level software, etc. However, there is not a legitimate reason for the computers that are not currently with the user to be operated, or for these computers to access remote systems to which the user has access. While these devices typically have their own local access controls (e.g., passwords, pins, etc.), such security measures are not always uniformly enforced, and sometimes have bypass vulnerabilities.

It would be desirable to address these issues.

SUMMARY

A device cluster management system dynamically determines which of a plurality of computing devices associated with a user are trusted and which are non-trusted, based on the physical and temporal proximity of the computing devices to the user. A plurality of computing devices used to access backend computing resources of an enterprise by a specific user are identified, and geo-locations of the computing devices at specific times are tracked. A trusted authentication is received from a specific one of the plurality of computing devices. The trusted authentication is more than a conventional control to access the computing device, and more than a conventional authentication for a computing device to access backend computing resources. In one embodiment, the trust authentication is in the form of a two-factor authentication.

Responsive to receiving the trusted authentication from the specific computing device, the specific computing device is classified as the primary node of a trusted cluster, and the current geo-location of the user is defined as the geo-location of the specific device, as of the time of the trusted authentication. Trusted and non-trusted computing devices of the plurality are determined, based on physical distances between geo-locations of the computing devices and the defined current geo-location of the user, and based on differences between establishment times of the geo-locations of the computing devices and the establishment time of the geo-location of the user. Trusted computing devices are allowed to access the backend resources (subject to conventional access controls), and non-trusted devices are blocked from accessing the backend resources. More specifically, trusted computing devices can be assigned to a logical trusted device cluster, and non-trusted computing devices assigned to a logical non-trusted device cluster. In one embodiment, such assignments are made for each computing device when a trusted authentication is received. In another embodiment, such assignments are made on a per computing device basis, when a specific computing device attempts to access backend resources and/or when a new geo-location is received from a specific computing device.

Responsive to receiving a new trusted authentication from a computing device, that computing device is classified as the primary node of the trusted cluster, and the current geo-location of the user is re-defined as the geo-location of that device, as of the time of the new trusted authentication. It is then re-determined which computing devices are trusted and which are non-trusted. The current geo-location of the user can also be re-defined responsive to receiving a new geo-location from the primary node of the trusted cluster (or in one embodiment from any trusted device). Such a re-definition of the user's current geo-location also triggers a re-determination of trusted and non-trusted computing devices.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
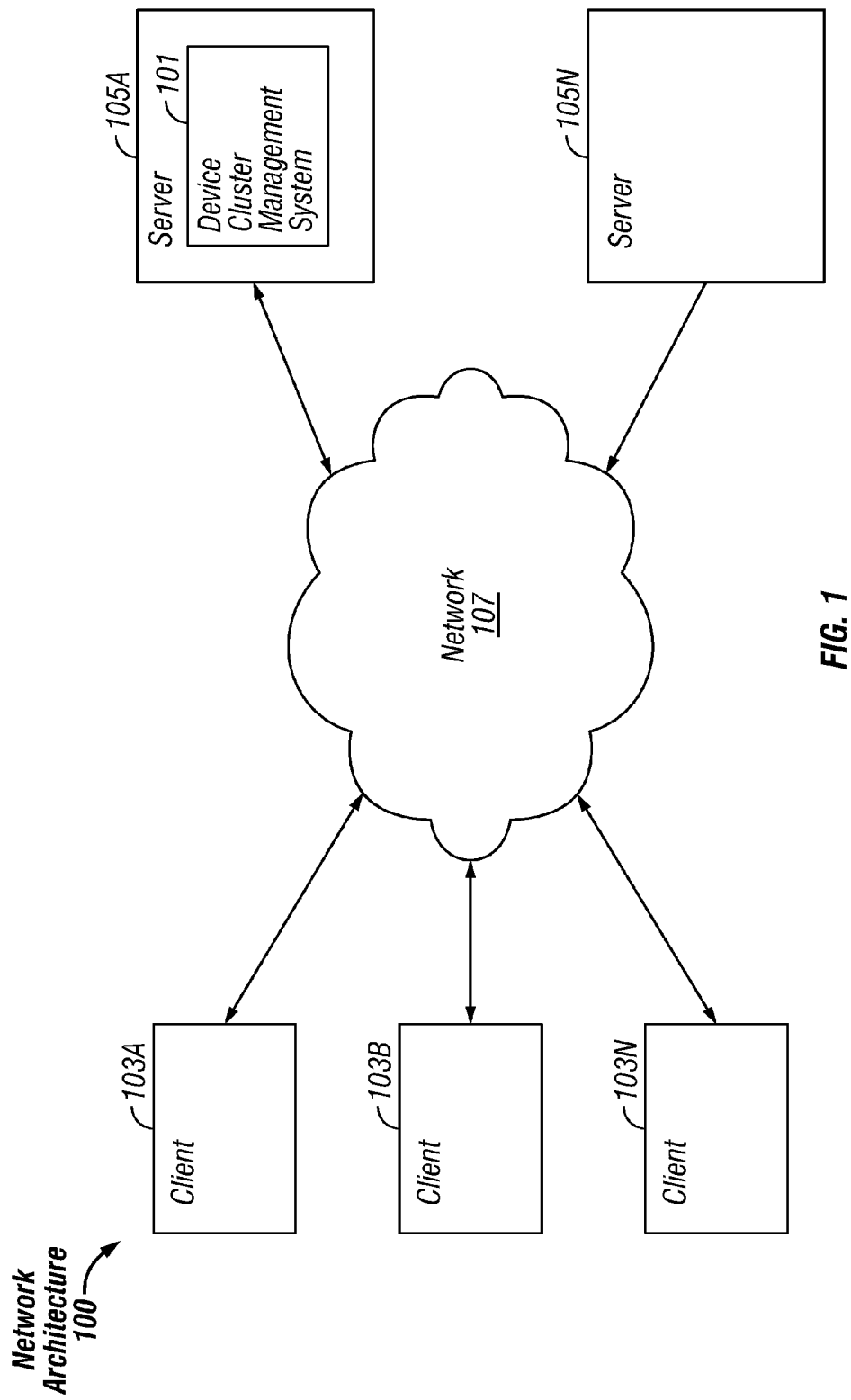
FIG. 1 is a block diagram of an exemplary network architecture in which a device cluster management system can be implemented, according to some embodiments.

FIG. 1 is a block diagram illustrating an exemplary network architecture 100 in which a device cluster management system 101 can be implemented. The illustrated network architecture 100 comprises multiple clients 103A, 103B and 103N, as well as multiple servers 105A and 105N. In FIG. 1, the device cluster management system 101 is illustrated as residing on server 105A. It is to be understood that this is an example only, and in various embodiments various functionalities of this system 101 can be instantiated on a server 105, a client 103, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers are another example of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
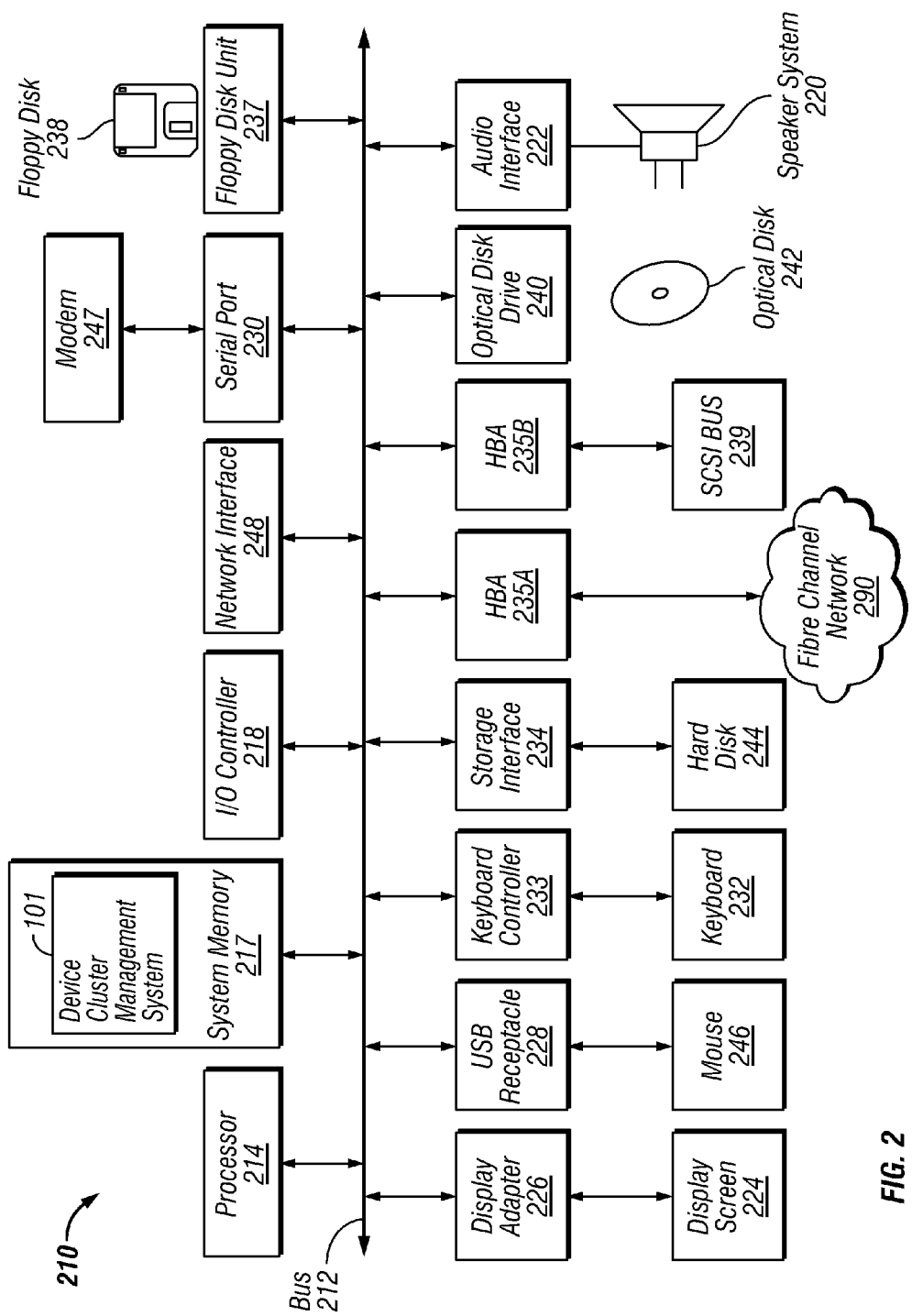
FIG. 2 is a block diagram of a computer system suitable for implementing a device cluster management system, according to some embodiments.

FIG. 2 is a block diagram of a computer system 210 suitable for implementing a device cluster management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the device cluster management system 101 is illustrated as residing in system memory 217. The workings of the device cluster management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
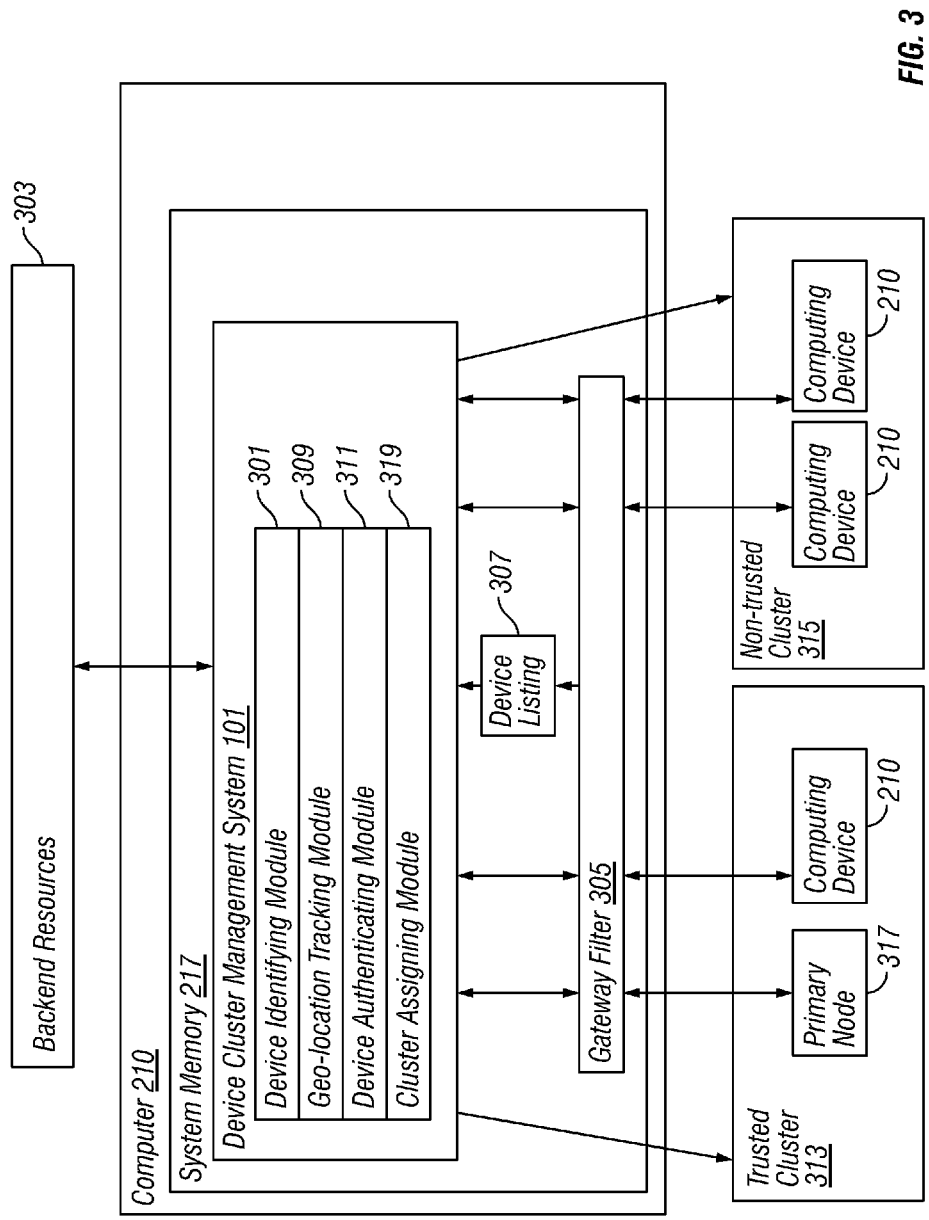
FIG. 3 is a block diagram of the operation of a device cluster management system, according to some embodiments.

FIG. 3 illustrates the operation of a device cluster management system 101, according to some embodiments. As described above, the functionalities of the device cluster management system 101 can reside on a client 103, a server 105, or be distributed between multiple computer systems 210, including within a cloud-based computing environment in which the functionality of the device cluster management system 101 is provided as a service over a network 107. It is to be understood that although the device cluster management system 101 is illustrated in FIG. 3 as a single entity, the illustrated device cluster management system 101 represents a collection of functionalities, which can be instantiated as a single or multiple modules as desired (an instantiation of specific, multiple modules of the device cluster management system 101 is illustrated in FIG. 3). It is to be understood that the modules of the device cluster management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the device cluster management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a device cluster management system 101 runs in the system memory 217 of a computer 210 and automatically detects which computing devices 210 are in the immediate control of the user and which are not. The device cluster management system 101 groups the user's computing devices 210 into two logical clusters, a first cluster 313 of devices 210 which are currently with the user, and thus under the user's physical control (the trusted cluster 313), and a second cluster 315 of devices 210 which are not currently located proximate to the user (the non-trusted cluster 315). The device cluster management system 101 permits access from the devices 210 in the trusted cluster 313, and prevents access from the devices 210 in the non-trusted cluster 515, thereby preventing inadvertent and unauthorized use of the computing devices 210 that are not currently in close physical proximity to the user.

A device identifying module 301 of the device cluster management system 101 identifies computing devices 210 used by specific individual users to access enterprise level computing resources 303 (e.g., mail servers, internal web sites, file systems containing enterprise level data). For efficiency of illustration, the enterprise level computing resources 303 are illustrated as a single entity, but it is to be understood that in practice these computing resources 303 would typically be distributed between multiple computer systems 210. For efficiency of description, the phrase "backend resources" 303 is used hereinafter to describe the various enterprise level computing resources 303 which user operated computing devices 210 attempt to access through a gateway filter 305. In FIG. 3, the gateway filter 305 is illustrated as residing on the same computer 210 as the device cluster management system 101. It is to be understood that in other embodiments these components are distributed between multiple computer systems 210.

The gateway filter 305 obtains information from mobile devices 210 attempting to access the backend resources 303. Such information can include an identifier of the specific user, the class of computing device 210 (e.g., an iPhone, an HTC or Samsung phone running Android), the specific device model (e.g., iPhone 4s), the device firmware level (e.g., iPhone 4s iOS 5.0.3), and/or a specific device identifier or certificate. In some instances, gateway filters maintain a listing 307 of all computing devices 210 provisioned by the company and registered to each user, and only allow user access from a registered device 210. This approach is becoming less common as "bring your own device" scenarios become more widespread in business settings. In other words, users are more frequently being allowed to use their personal mobile devices 210 to remotely access backend resources 303.

In an embodiment in which the gateway filter 305 maintains a listing 307 of devices 210 registered to specific users, the device identifying module 301 receives the listing 307 from the gateway filter 305. In scenarios in which the enterprise allows users to remotely access backend resources 303 with unregistered devices 210, the device identifying module 301 builds listings 307 of which devices 210 are associated with specific users on the fly, as users access backend resources 303 through the gateway filter 305. More specifically, attempts to remotely access backend resources 303 include a user identifier and a device 210 identifier. This information is provided to the device identifying module 301 by the gateway filter 305. Where an association between the user and the specific device is not already documented in the listing 307, the device identifying module 301 adds the association.

Whenever a computing device 210 attempts to remotely access backend resources 303 through the gateway filter 305, a geo-location tracking module 309 of the device cluster management system 101 tracks the current geo-location of the device 210, as well as the time at which the geo-location was determined. In scenarios in which the device's geo-location is not provided to the gateway filter 305 by default (e.g., providing this information is not currently part of the protocol used by Exchange ActiveSync, but could be so in other gateway filter protocols), different embodiments obtain this information in different ways. In one embodiment, an extended protocol which includes the device's geo-location is used to remotely access backend resources 303. In this embodiment, only devices 210 running the extended protocol are allowed such access. In another embodiment, an application (e.g., an iOS or Android app) is run on each device 210 which transmits the device's geo-location from time to time, for example whenever the device 210 attempts to access backend resources 303, whenever the device 210 is moved more than a given distance, whenever the user authenticates the device 210 to the device cluster management system 101, at regular intervals of time, etc.

Over time, the geo-location tracking module 309 of the device cluster management system 101 continues to track the geo-locations of the devices 210 associated with the user, and the times of establishment of the geo-locations. In embodiments in which the gateway filter protocol includes (or is extended to include) the geo-location of the device 210 attempting to access backend resources 303, whenever a device 210 attempts such access, the geo-location tracking module 309 notes the current time and the device's current geo-location. In embodiments in which devices 210 periodically provide their current geo-location to the device cluster management system 101, whenever a device 210 provides such information, the geo-location tracking module 309 notes it along with the current time. Either way, the geo-location tracking module 309 maintains the most recently reported geo-location of each device 210 associated with the user, as well as the time that the geo-location was reported by the device 210.

Computing devices 210 can obtain their own geo-locations in a variety of ways, for example from an onboard GPS transceiver, through triangulation, etc. In one embodiment, one device 210 (e.g., a mobile phone) with the capability of obtaining a current geo-location can provide that information to a second, proximately located device 210, such as a laptop, for example by transmitting the geo-location to the second device over a short range wireless connection (e.g., Bluetooth, near field communication, etc.) or a wired connection (e.g., USB, etc.). It is to be understood that the format used to represent a geo-location can vary between embodiments and devices 210 (e.g., decimal degrees with negative numbers for South and West; degrees and decimal minutes with N, S, E or W suffix for North, South, East, West; degrees, minutes and seconds with N, S, E or W prefix for North, South, East, West; etc.).

In order to initiate the grouping of devices 210 associated with a specific user into a trusted device cluster 313 and a non-trusted device 315 cluster, a device authenticating module 311 of the device cluster management system 101 receives a trusted authentication from a specific device 210. The specific protocol used for this trusted authentication can vary between embodiments, but in any case comprises something more than the conventional control for a user to access the device 210 itself or the conventional authentication for access of backend resources 303 by the device 210. Conventional access controls and authentication might, for example, require the user to enter a password or PIN to unlock the device 210, or that the device 210 provide a user identifier and password to access the user's corporate email account. The trusted authentication between a device 210 and the device authenticating module 311 involves something additional, such as a two factor authentication. A two-factor authentication is an approach which requires the presentation of two or more authentication factors, typically "something the user knows" (e.g., a password) plus "something the user has" (e.g., a hard or soft token) or "something the user is" (e.g., a biometric such as a fingerprint scan, a retinal scan, a voice print). When a computing device 210 is authenticated to the device authenticating module 311 in a trusted manner, that device 210 is classified as the "primary node" 317 of the trusted cluster 313. It is to be understood that the specific trusted protocol used to authenticate a device 210 as the primary node 317 of the trusted cluster 313 varies between embodiments.

The primary node 317 of the trusted cluster 313 is always the device 210 from which a trusted authentication was most recently performed. The operations of the primary node 317 are explained in detail below. The current geo-location of the user is defined as the geo-location of the primary node 317 at the time of the trusted authentication, and the time of the trusted authentication is noted as the time at which the geo-location of the user was current. The functions of these parameters are explained in detail below. Once a specific device 210 has been authenticated and classified as the primary node 317 of the trusted cluster 313, the current time and geo-location of the user, in combination with the listing 307 of the devices 210 associated with the user and the geo-location histories of those devices 210, can be used to assign devices 210 associated with the user to either the trusted cluster 313 or the non-trusted cluster 315.

In one embodiment, a cluster assigning module 319 of the device cluster management system 101 assigns devices 210 associated with the user to either the trusted cluster 313 or the non-trusted cluster 315, depending upon whether the geo-location of the given device 210 is within a given proximity to the user's current location (as determined from the geo-location of the primary node 317), and the amount of the time that has transpired since the user's geo-location was established. In other words, whether a given device 210 is trusted or not at a given time is a function of its distance from the user's most recently known geo-location, and the amount of time since that geo-location was established as being current.

In one embodiment, whenever a device 210 associated with the user other than the primary node 317 attempts to access backend resources 303 through the gateway 305, the geo-location of that device 210 is compared to user's geo-location as determined from the primary node 317, and a determination as to whether the device 210 is to be trusted or not is made based on the difference between the geo-locations, as well as the difference in time from when the user's current geo-location was last established to the time of the current access attempt. These values comprise variable input parameters to an algorithm used to determine trust, but in general differences in distance that could be "reasonably" expected to occur over the difference in time result in a trusted status for the device 210, provided that the amount of time that transpired is not so long as to be considered "stale." The specific values that are considered "reasonable" distances to have been traversed per specific amount of time vary between embodiments (e.g., 100 yards per 10 minutes, one mile per 30 minutes, ten miles per hour). Additionally, the amount of time until the user's current user geo-location as determined from the primary node 317 is considered stale, and thus another trusted authentication is required varies between embodiments (e.g., thirty minutes, one hour, twelve hours). It is to be further understood that in one embodiment, where the geo-location tracking module 309 is unable to determine the geo-location of a given device 210 (because, e.g., the user has turned off the GPS), that device 210 is not trusted. Additionally, in one embodiment, where more than a certain amount of time has transpired since a device 210 other than the primary node 317 reported its geo-location to the geo-location tracking module 309 (e.g., an hour, five hours, twenty four hours), that device 210 is not trusted.

If a specific device 210 associated with the user is adjudicated to be trusted based on the above-described processing, the device 210 is logically assigned to the trusted cluster 313, and the device 210 is allowed to transverse the gateway to access backend resources 303. Such access is subject to whatever conventional access controls are in place, e.g., providing a password or the like. Where a given device 210 is adjudicated to be non-trusted, the device is logically assigned to the non-trusted cluster 315, and the device 210 is not allowed to access backend resources 303.

Note that because the geo-location tracking module 309 tracks the geo-locations of all devices 210 associated with the user, the geo-location tracking module 309 tracks the geo-location of the current primary node 317, which is one of these devices 210. Thus, whenever the current primary node 317 reports its current geo-location to the geo-location tracking module 309, the reported current geo-location of the primary node 317 is established as the user's current geo-location, as of the time that the primary node's current geo-location was reported. This updating of the user's current geo-location based on the reported geo-location of the primary node 317 can be subject to the primary node's currently reported geo-location being within a specific distance and temporal proximity to the one on record, as described above in the context of other devices 210. In other words, if the primary node 317 has moved more than a certain distance in a given amount of time, the newly reported geo-location is not trusted, and a new trusted authentication is required.

It is to be understood that this updating of the user's current geo-location can cause currently non-trusted devices 210 to become trusted and vice versa. For example, suppose the current primary node 317 is in the form of the user's workstation class laptop, and the user left a powered-on smartphone in a drawer at home. While the user is away from home for the weekend and is carrying the workstation class laptop (the primary node 317), the smartphone in the drawer will be non-trusted due to its not being in sufficient physical proximity to the laptop. In other words, the device cluster management system 101 will determine that the laptop is under the current physical control of the user but that the smartphone is not. Therefore, when the smartphone in the drawer attempts, e.g., to automatically synchronize with the user's corporate email server 105, the access attempt will fail. This is proper according to the workings of the device cluster management system 101. Because the user is not in physical control of the smartphone, it is desirable not to trust it, and to block its attempts to access backend resources 303 (in this case it is in the user's drawer, but it could be lost or stolen). However, when the user returns home with the laptop, the laptop will report its current geo-location to the device cluster management system 101, which will update the user's current location and the reported time thereof. The next attempt by the smartphone to synchronize with the mail server 105 will succeed, because the smartphone is now in close physical proximity to the user's current geo-location, as determined from the primary node 317 (i.e., the laptop), and is thus trusted again.

In one embodiment, the current geo-location of the user is only updated in response to the current primary node 317 reporting its current geo-location. In another embodiment, whenever a currently trusted device 210 reports its current geo-location, the current geo-location of the user is updated accordingly, as of the current time. As with updates to the user's current geo-location based on reporting from the primary node 317, such updates can be subject to the distance in space and time between the reported data and the established current geo-location of the user being within acceptable bounds.

It is to be understood that the trusted cluster 313 and the non-trusted cluster 315 are logical groupings of devices 210, as opposed to clusters of physically coupled devices 210. In one embodiment, whenever a device is authenticated to the device cluster management system 101 according to the trusted protocol described above (or whenever a current user location is established), the cluster assigning module 319 proactively assigns each device 210 associated with the user to the appropriate logical cluster based on the distance and temporal proximity criteria described above. In another embodiment, the cluster assigning module 319 makes such assignments on a per device 210 basis in response to a given device 210 attempting to access backend resources 303 (and/or in response to the device reporting its current geo-location).

At any point, the user can execute the trusted authentication procedure described above from any one of the computing devices 210 associated with the user. This has the effect of establishing the device 210 from which the user executed the trusted authentication procedure as the primary node 317 of the trusted cluster 313, and setting that device's geo-location as the current location of the user, as of the time the trusted authentication occurred. This can result in devices 210 that were previously in the non-trusted cluster 315 being assigned to the trusted cluster 313 (and vice versa), depending upon the geo-locations 313 and check-in times of the devices 210 relative to the new geo-location of the user, established by and at the time of the trusted authentication.

In some embodiments, specific countermeasures can be taken against devices 210 determined to be in the non-trusted cluster 315, to protect against security breaches originating from those devices 210. For example, the device cluster management system 101 can remotely issue commands (e.g., in the form of text messages or other types of control signals) to devices 210 to erase all of the data stored thereon, erase specific data (e.g., all corporate data, all privacy sensitive data, etc.), disable all communication functionality, disable the use of the phone, etc. It is to be understood that which specific actions are taken with regards to devices 210 in the non-trusted cluster 315 under what specific circumstances can vary between embodiments as desired.

For example, if the user loses a smartphone or tablet computer, it may be desirable to erase all of the data (or all of the corporate data) from the device 210. On the other hand, it would not be desirable to do so if the device 210 were simply left in a drawer at home or the office while the user went on a business trip. Thus, in one embodiment, certain geo-locations are defined by the device cluster management system 101 as trusted locations. Such trusted geo-locations can comprise, for example, the user's office, the user's house, a satellite office of the company from which the user frequently works, etc. Trusted geo-locations can be defined with varying degrees of precision in different embodiments (e.g., a specific building, a specific block, a specific city). In such embodiments, no data erasing measures would be taken against devices 210 at trusted geo-locations, even when the devices 210 are currently not trusted based on the location of the user. However, if a non-trusted device 210 is located, e.g., more than a certain distance (e.g., 10 miles, 100 miles, 1000 miles) from a trusted geo-location for, e.g., more than a certain amount of time (e.g., a day, a week, a month), the device cluster management system 101 could transmit a command to the device 210 to wipe some or all of its stored data. Such functionality guards against accidental device 210 loss while a user is traveling, and provides an automatic way to detect and protect against such loss, even before the user may be aware of it.

It is to be understood that this is just an example of an action that the device cluster management system 101 can perform to protect against threats from non-trusted devices 210 under given specific circumstances. Other actions (e.g., disabling the device, disabling some or all communication functions, directing the device to sound an alarm or constantly broadcast its geo-location, etc.) can be taken under other circumstances (e.g., in response to prompting the user) as desired.

Figure 4:
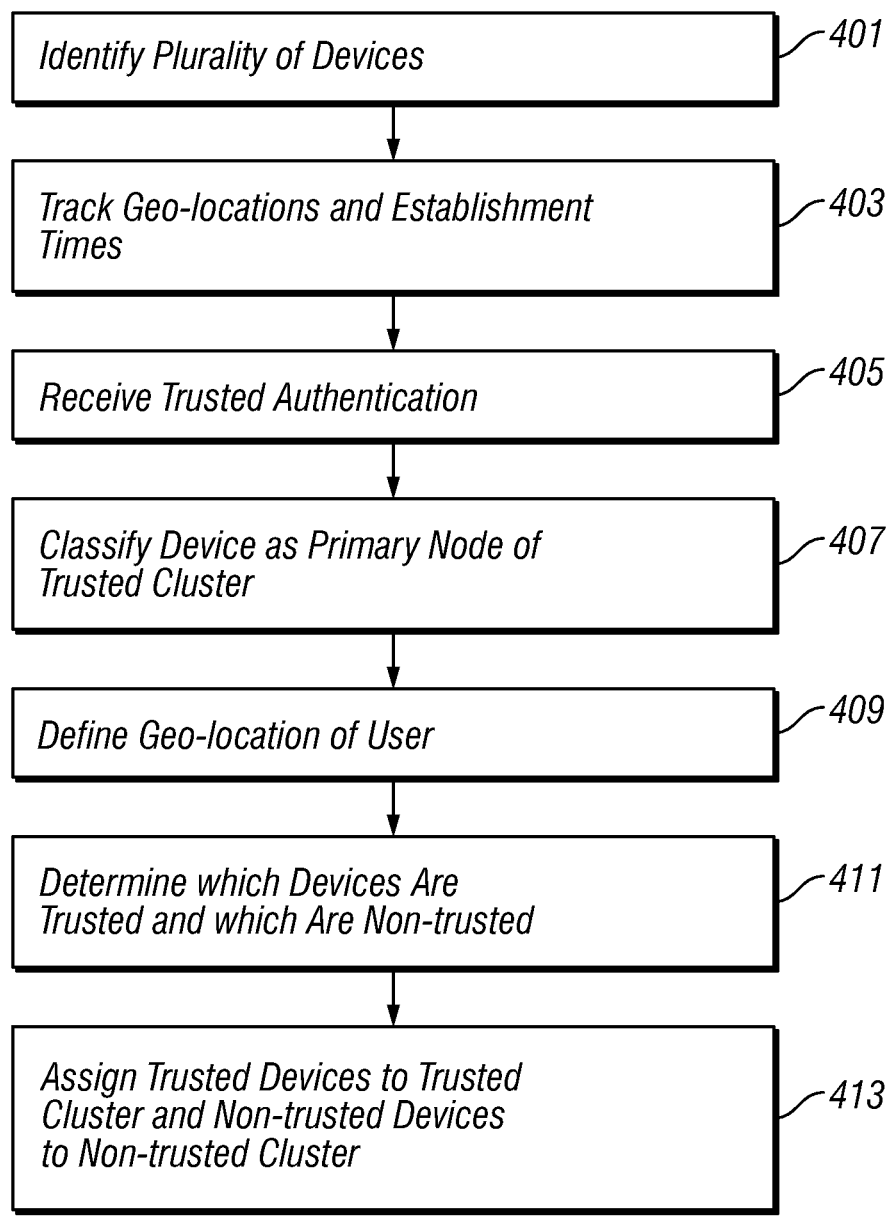
FIG. 4 is a flowchart of the operation of a device cluster management system, according to some embodiments.

FIG. 4 is a flowchart of the operation of the device cluster management system 101, according to some embodiments. The device identifying module 301 identifies 401 a plurality of computing devices 210 associated with a user, each of which is used to access backend computing resources 303 of an enterprise. The geo-location tracking module 309 tracks 403 the geo-locations of the computing devices 210, and the times at which the tracked geo-locations are established. The device authenticating module 311 receives 405 a trusted authentication from a specific one of the plurality of computing devices 210. Responsive to receiving the trusted authentication from the specific computing device 210, the cluster assigning module 319 classifies 407 the specific computing device 210 as the primary node 319 of the trusted cluster 313, and defines 409 the current geo-location of the user as the geo-location of the specific device 210, as of the time of the trusted authentication. The cluster assigning module 319 determines 411 which of the computing devices 210 of the plurality are trusted and which are non-trusted, based on physical distances between the geo-locations of the computing devices 210 and the defined current geo-location of the user, and based on differences between establishment times of the geo-locations of the computing devices 210 and the establishment time of the geo-location of the user. The cluster assigning module 319 assigns 413 trusted computing devices 210 to the trusted cluster 313 and non-trusted computing devices 210 to the non-trusted cluster 315.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for dynamically determining which of a plurality of computing devices associated with a user are trusted and which are non-trusted, based on physical and temporal proximity between the computing devices and the user, the method comprising the steps of:
    identifying a plurality of computing devices associated with a user, each computing device of the plurality of computing devices being used to access backend computing resources of an enterprise;
    tracking geo-locations of the computing devices of the plurality of computing devices, and times of establishment of the tracked geo-locations;
    receiving a trusted authentication from a specific one of the plurality of computing devices, wherein the trusted authentication comprises more than a conventional control for a user to access the computing device and more than a conventional authentication for a computing device to access backend computing resources;
    responsive to receiving the trusted authentication from the specific computing device, classifying the specific computing device as a primary node of a trusted cluster, and defining a current geo-location of the user as the geo-location of the specific device, as of a time of the trusted authentication; and
    determining trusted and non-trusted computing devices of the plurality of computing devices, based on physical distances between geo-locations of the computing devices and the defined current geo-location of the user, and based on differences in time between times of establishment of the geo-locations of the computing devices and a time of establishment of the geo-location of the user;
    wherein the trusted computing devices are allowed to access the backend resources subject to conventional access controls and the non-trusted devices are not allowed to access the backend resources.

2. The method of claim 1 further comprising:
    assigning trusted computing devices to a logical trusted device cluster; and
    assigning non-trusted computing devices to a logical non-trusted device cluster.

3. The method of claim 1 wherein determining trusted and non-trusted computing devices of the plurality further comprises:
    responsive to receiving a trusted authentication from a specific computing device, determining whether each computing device of the plurality is trusted;
    assigning trusted computing devices to a logical trusted device cluster; and
    assigning non-trusted computing devices to a logical non-trusted device cluster.

4. The method of claim 1 wherein determining trusted and non-trusted computing devices of the plurality further comprises:
    responsive to a specific computing device attempting to access backend resources, determining whether the specific computing device is trusted.

5. The method of claim 1 wherein determining trusted and non-trusted computing devices of the plurality further comprises:
    responsive to receiving a new geo-location from a specific computing device, determining whether the specific computing device is trusted.

6. The method of claim 1 further comprising:
    receiving a new trusted authentication from a new, specific one of the plurality of computing devices;
    responsive to receiving the new trusted authentication from the new, specific computing device, classifying the new, specific computing device as the primary node of the trusted cluster, and defining the current geo-location of the user as the geo-location of the new, specific device, as of a time of the new trusted authentication; and
    re-determining trusted and non-trusted computing devices of the plurality.

7. The method of claim 1 further comprising:
    receiving a new geo-location from the primary node of the trusted cluster;
    re-defining the current geo-location of the user as the new geo-location of the primary node, as of a time of receiving the new geo-location; and
    re-determining trusted and non-trusted computing devices of the plurality.

8. The method of claim 1 further comprising:
    receiving a new geo-location from a trusted device;
    re-defining the current geo-location of the user as the new geo-location of the trusted device, as of a time of receiving the new geo-location; and
    re-determining trusted and non-trusted computing devices of the plurality.

9. The method of claim 1 further comprising:
    receiving an attempt from a non-trusted computing device to access backend resources; and
    blocking the received attempt.

10. The method of claim 1 further comprising:
    classifying a computing device as being non-trusted responsive to not being able to determine a current geo-location of the computing device.

11. The method of claim 1 wherein receiving a trusted authentication from a specific one of the plurality of computing devices further comprises:
    receiving a two-factor authentication from the specific one of the plurality of computing devices.

12. At least one non-transitory computer readable medium for dynamically determining which of a plurality of computing devices associated with a user are trusted and which are non-trusted, based on physical and temporal proximity between the computing devices and the user, the at least one non-transitory computer readable medium storing program code that, when loaded into computer memory and executed by a processor performs the following steps:
    a identifying a plurality of computing devices associated with a user, each computing device of the plurality of computing devices being used to access backend computing resources of an enterprise;

tracking geo-locations of the computing devices of the plurality of computing devices, and times of establishment of the tracked geo-locations;

receiving a trusted authentication from a specific one of the plurality of computing devices, wherein the trusted authentication comprises more than a conventional control for a user to access the computing device and more than a conventional authentication for a computing device to access backend computing resources;

responsive to receiving the trusted authentication from the specific computing device, classifying the specific computing device as a primary node of a trusted cluster, and defining a current geo-location of the user as the geo-location of the specific device, as of a time of the trusted authentication; and determining trusted and non-trusted computing devices of the plurality of computing devices, based on physical distances between geo-locations of the computing devices and the defined current geo-location of the user, and based on differences in time between times of establishment of the geo-locations of the computing devices and a time of establishment of the geo-location of the user;

wherein the trusted computing devices are allowed to access the backend resources subject to conventional access controls and the non-trusted devices are not allowed to access the backend resources.

13. The at least one non-transitory computer readable of claim 12 further storing program code that, when loaded into computer memory and executed by a processor performs the following steps:

assigning trusted computing devices to a logical trusted device cluster; and assigning non-trusted computing devices to a logical non-trusted device cluster.

14. The at least one non-transitory computer readable of claim 12 wherein determining trusted and non-trusted computing devices of the plurality further comprises:

responsive to receiving a trusted authentication from a specific computing device, determining whether each computing device of the plurality is trusted;

assigning trusted computing devices to a logical trusted device cluster; and assigning non-trusted computing devices to a logical non-trusted device cluster.

15. The at least one non-transitory computer readable of claim 12 wherein determining trusted and non-trusted computing devices of the plurality further comprises:

responsive to a specific computing device attempting to access backend resources, determining whether the specific computing device is trusted.

16. The at least one non-transitory computer readable of claim 12 wherein determining trusted and non-trusted computing devices of the plurality further comprises:

responsive to receiving a new geo-location from a specific computing device, determining whether the specific computing device is trusted.

17. The at least one non-transitory computer readable of claim 12 further storing program code that, when loaded into computer memory and executed by a processor performs the following steps:

receiving a new trusted authentication from a new, specific one of the plurality of computing devices;

responsive to receiving the new trusted authentication from the new, specific computing device, classifying the new, specific computing device as the primary node of the trusted cluster, and defining the current geo-location of the user as the geo-location of the new, specific device, as of a time of the new trusted authentication; and re-determining trusted and non-trusted computing devices of the plurality.

18. The at least one non-transitory computer readable of claim 12 further storing program code that, when loaded into computer memory and executed by a processor performs the following steps:

receiving a new geo-location from the primary node of the trusted cluster;

re-defining the current geo-location of the user as the new geo-location of the primary node, as of a time of receiving the new geo-location; and re-determining trusted and non-trusted computing devices of the plurality.

19. The at least one non-transitory computer readable of claim 12 further storing program code that, when loaded into computer memory and executed by a processor performs the following steps:

receiving an attempt from a non-trusted computing device to access backend resources; and blocking the received attempt.

20. A computer system for dynamically determining which of a plurality of computing devices associated with a user are trusted and which are non-trusted, based on physical and temporal proximity between the computing devices and the user, the computer system comprising:

computer memory;

at least one processor;

a device identifying module residing in the computer memory, configured to identify a plurality of computing devices associated with a user, each computing device of the plurality of computing devices being used to access backend computing resources of an enterprise;

a geo-location tracking module residing in the computer memory, configured to track geo-locations of the computing devices of the plurality of computing devices, and times of establishment of the tracked geo-locations;

a device authenticating module residing in the computer memory, configured to receive a trusted authentication from a specific one of the plurality of computing devices, wherein the trusted authentication comprises more than a conventional control for a user to access the computing device and more than a conventional authentication for a computing device to access backend computing resources;

a cluster assigning module residing in the computer memory, configured to classify the specific computing device as a primary node of a trusted cluster, and to define a current geo-location of the user as the geo-location of the specific device as of a time of the trusted authentication, responsive to receiving the trusted authentication from the specific computing device; and the cluster assigning module being further configured to determine trusted and non-trusted computing devices of the plurality of computing devices, based on physical distances between geo-locations of the computing devices and the defined current geo-location of the user, and based on differences in time between times of establishment of the geo-locations of the computing devices and a time of establishment of the geo-location of the user;

wherein the trusted computing devices are allowed to access the backend resources subject to conventional access controls and the non-trusted devices are not allowed to access the backend resources.

* * * * *

UNITED STATES PATENT AND TRADEMARK OFFICE
CERTIFICATE OF CORRECTION

| | |
|---|---|
| PATENT NO. | : 8,561,142 B1 |
| APPLICATION NO. | : 13/487099 |
| DATED | : October 15, 2013 |
| INVENTOR(S) | : Sobel |

It is certified that error appears in the above-identified patent and that said Letters Patent is hereby corrected as shown below:

In the Claims

Column 13
Claim 13, line 28; Claim 14, line 36; Claim 15, line 46; Claim 16, line 52; Claim 17, line 58, delete "computer readable of" and insert --computer readable medium of--

Column 14
Claim 18, line 5; Claim 19, line 17, delete "computer readable of" and insert --computer readable medium of--

Signed and Sealed this
Eleventh Day of February, 2014

Michelle K. Lee
*Deputy Director of the United States Patent and Trademark Office*